United States Patent [19]

Arlt

[11] Patent Number: 5,573,463
[45] Date of Patent: Nov. 12, 1996

[54] ELASTOMERIC DRIVE LINE COUPLING FOR TRANSMITTING TORQUE AND SIMULTANEOUSLY ACCOMODATING SHAFT MISALIGNMENTS AND ANGULAR DEFLECTIONS

[75] Inventor: Edward J. Arlt, Arlington, Tex.

[73] Assignee: Continental Emsco Company, Houston, Tex.

[21] Appl. No.: 247,011

[22] Filed: May 20, 1994

[51] Int. Cl.⁶ .................................. F16D 3/56; F16D 3/64
[52] U.S. Cl. .............................................. 604/90; 464/147
[58] Field of Search .............................. 464/89, 90, 106, 464/147, 150, 151, 158, 159, 162

[56] References Cited

U.S. PATENT DOCUMENTS

| | | |
|---|---|---|
| 1,868,818 | 7/1932 | Eksergian . |
| 2,736,580 | 2/1956 | Boetcker ............................ 287/12 |
| 2,841,968 | 7/1958 | Helmke ............................. 464/106 |
| 2,855,232 | 10/1958 | Kozak ............................... 287/85 |
| 2,861,827 | 11/1958 | Langen et al. ..................... 287/90 |
| 2,956,187 | 10/1960 | Wood ............................ 464/89 X |
| 2,995,907 | 8/1961 | Orain ................................ 464/90 |
| 3,007,728 | 11/1961 | Hoffman ............................ 287/90 |
| 3,010,772 | 11/1961 | Kellogg et al. .................... 309/20 |
| 3,025,090 | 3/1962 | Langen .............................. 287/87 |
| 3,089,717 | 5/1963 | Gair ................................. 287/85 |
| 3,290,073 | 12/1966 | Gottschald ......................... 287/90 |
| 3,290,074 | 12/1966 | Korecky ............................ 287/90 |
| 3,292,958 | 12/1966 | Oishei .............................. 287/87 |
| 3,343,857 | 9/1967 | Cislo ............................... 287/90 |
| 3,362,735 | 1/1968 | Maxeiner ........................... 287/90 |
| 3,486,348 | 12/1969 | Firth ............................... 64/11 |
| 3,531,949 | 10/1970 | Downey ............................. 64/11 |

(List continued on next page.)

FOREIGN PATENT DOCUMENTS

| | | | |
|---|---|---|---|
| 0145572 | 6/1985 | European Pat. Off. ......... | B62D 1/16 |
| 0263231 | 4/1988 | European Pat. Off. ......... | F16D 3/80 |
| 750729 | 8/1933 | France . | |
| 7210810 | 11/1973 | France ............................. | F16D 1/00 |
| 0517396 | 6/1957 | Italy .............................. | 464/89 |
| 0256683 | 12/1985 | Japan ............................. | 464/150 |
| 001765569 | 9/1992 | U.S.S.R. .......................... | 464/150 |
| 627902 | 8/1949 | United Kingdom . | |
| 1482599 | 8/1977 | United Kingdom .............. | F16D 3/76 |
| 7900033 | 1/1979 | WIPO ............................. | 464/90 |

OTHER PUBLICATIONS

Laminated Teeter Bearing Contributes to the Advance of Wind Turbine Technology.
The Sikorsky Spirit: A New Breed of Helicopter.
Paul T. Herbst; Natural Rubber as a Bearing Material for Rotary Wing Aircraft Applications; Lord Corporation; 1973.
J. L. Potter; The Elastomeric Bearing: What It Can Do For You; The American Society of Mechanical Engineers for presentation at the Design Engineering Conference & Show, Philadelphia, Pa., Apr. 9–12, 1973.
Undated Material on U–Joints and Dynaflex Couplings.

*Primary Examiner*—Daniel P. Stodola
*Assistant Examiner*—Emmanuel M. Marcelo
*Attorney, Agent, or Firm*—Arnold, White & Durkee

[57] ABSTRACT

An elastomeric drive line coupling. The coupling includes an input drive shaft having a longitudinal axis and terminating at one end with a housing and an output drive shaft having a longitudinal axis and terminating at one end with a ball. The housing has a partially elliptical interior and the ball has a partially elliptical exterior which is disposed within the housing. A partially elliptical rigid shell is provided between the ball and the housing. Both the ball and the rigid shell are bonded with elastomeric layers forming interleaved nested ellipses within the housing. These ellipses are oriented 90° out of phase from one another. Torsional loads are applied to the output drive shaft by the input drive shaft through compression deformation of the elastomeric layers as the partially elliptical rigid shell attempts to rotate relative to the housing and the ball. Angular deflections of the output drive shaft relative to the input drive shaft are accommodated through shear deflections of the elastomeric layers as the partially spherical rigid shell attempts to slide relative to the housing and the ball.

4 Claims, 4 Drawing Sheets

U.S. PATENT DOCUMENTS

| | | | |
|---|---|---|---|
| 3,539,210 | 11/1970 | Wehner | 287/87 |
| 3,545,231 | 12/1970 | Downey | 64/11 |
| 3,574,369 | 4/1971 | Andrew | 287/90 |
| 3,605,440 | 9/1971 | Firth | 64/11 R |
| 3,621,674 | 11/1971 | Ulics et al. | 64/11 B |
| 3,635,049 | 1/1972 | Schlotmann et al. | 64/11 R |
| 3,702,545 | 11/1972 | Schlotmann et al. | 64/11 R |
| 3,727,429 | 4/1973 | Downey | 64/11 R |
| 3,740,968 | 6/1973 | Orain | 64/11 |
| 3,747,366 | 7/1973 | Küggen et al. | 64/11 |
| 3,760,605 | 9/1973 | Schroder | 64/9 |
| 3,843,272 | 10/1974 | Jorn | 403/132 |
| 3,879,959 | 4/1975 | Clampett | 64/14 |
| 3,884,049 | 5/1975 | Pauli | 64/14 |
| 3,885,657 | 5/1975 | Sato | 192/79 |
| 3,888,093 | 6/1975 | Downey | 64/13 |
| 3,902,333 | 9/1975 | Dossier | 64/14 |
| 3,924,419 | 12/1975 | Barth | 64/14 |
| 3,940,946 | 3/1976 | Andersen | 464/89 |
| 3,944,376 | 3/1976 | Hata | 403/132 |
| 3,969,030 | 7/1976 | Sullivan | 403/132 |
| 4,006,892 | 2/1977 | Koeneman | 267/153 |
| 4,034,575 | 7/1977 | Barth | 64/14 |
| 4,037,431 | 7/1977 | Sugimoto | 64/14 |
| 4,070,123 | 1/1978 | Willingshofer | 403/132 |
| 4,163,617 | 8/1979 | Nemoto | 403/132 |
| 4,172,369 | 10/1979 | Hayes et al. | 64/14 |
| 4,200,004 | 4/1980 | Bremer, Jr. | 74/574 |
| 4,203,683 | 5/1980 | Rogers | 403/132 |
| 4,220,056 | 9/1980 | Bremer, Jr. | 74/574 |
| 4,241,593 | 12/1980 | Matyl et al. | 64/14 |
| 4,246,767 | 1/1981 | Chivari | 64/11 |
| 4,249,396 | 2/1981 | Ziegler | 64/27 |
| 4,259,027 | 3/1981 | Hata | 403/132 |
| 4,269,043 | 5/1981 | Kizu et al. | 64/11 |
| 4,286,442 | 9/1981 | Peterson | 64/31 |
| 4,308,728 | 1/1982 | Croset | 64/11 |
| 4,322,062 | 3/1982 | Aleck | 267/154 |
| 4,347,716 | 9/1982 | Hackforth et al. | 464/83 |
| 4,353,660 | 10/1982 | Parks | 403/132 |
| 4,368,050 | 1/1983 | Peterson | 464/83 |
| 4,391,594 | 7/1983 | Hannibal et al. | 464/80 |
| 4,452,591 | 6/1984 | Fishbaugh et al. | 464/89 |
| 4,472,154 | 9/1984 | Kryscyk | 464/73 |
| 4,472,155 | 9/1984 | Greding | 464/73 |
| 4,483,685 | 11/1984 | Spasiano et al. | 464/83 |
| 4,500,300 | 2/1985 | Wolf et al. | 464/83 |
| 4,504,244 | 3/1985 | Wolf et al. | 464/83 |
| 4,527,986 | 7/1985 | Bridgewater | 464/73 |
| 4,536,170 | 8/1985 | Downey | 464/80 |
| 4,540,382 | 9/1985 | Wilson | 464/73 |
| 4,551,115 | 11/1985 | Ferguson | 464/83 |
| 4,552,543 | 11/1985 | Wolf et al. | 464/83 |
| 4,557,703 | 12/1985 | Rivin | 464/73 |
| 4,560,367 | 12/1985 | Wolf et al. | 464/83 |
| 4,568,312 | 2/1986 | Geisthoff | 464/162 |
| 4,601,678 | 7/1986 | Wolf et al. | 464/83 |
| 4,627,885 | 12/1986 | Arlt | 156/160 |
| 4,714,368 | 12/1987 | Sawada et al. | 403/132 |
| 4,768,993 | 9/1988 | Axelsson et al. | 464/83 |
| 4,787,878 | 11/1988 | Nikkel | 464/83 |
| 4,875,794 | 10/1989 | Kern, Jr. | 403/132 |
| 4,961,254 | 10/1990 | Andra et al. | 29/173 |
| 4,995,754 | 2/1991 | Ishii | 403/132 |
| 5,011,320 | 4/1991 | Love et al. | 403/132 |
| 5,025,681 | 6/1991 | Andrä | 74/574 |
| 5,083,725 | 1/1992 | Byrnes et al. | 244/17.25 |
| 5,085,289 | 2/1992 | Chance | 464/89 X |
| 5,113,713 | 5/1992 | Isabelle et al. | 74/410 |
| 5,246,399 | 9/1993 | Yanko et al. | 464/63 |
| 5,303,907 | 4/1994 | Holzheimer | 267/281 |

ELASTOMERIC DRIVE LINE COUPLING FOR TRANSMITTING TORQUE AND SIMULTANEOUSLY ACCOMODATING SHAFT MISALIGNMENTS AND ANGULAR DEFLECTIONS

FIELD OF THE INVENTION

The present invention relates generally to a drive line coupling and, more particularly, to an elastomeric drive line coupling which will transmit torque while simultaneously accommodating shaft misalignments and angular deflections of at least one shaft.

BACKGROUND OF THE INVENTION

A conventional drive line coupling or constant velocity universal joint ("U-joint") is a linkage that transmits rotation between two shafts whose axes are coplanar but not coinciding. The conventional U-joint finds applications in almost every class of machinery, such as automobiles, trucks, farm machinery, industrial equipment, boats, ships, airplanes and helicopters.

The most common U-joint is a Cardan joint. It consists of two yokes attached to their respective shafts (an input drive shaft and an output drive shaft) and connected by means of a cross journal assembly. Bearings are mounted between the yokes and the cross journal to facilitate torsional transmission between the shafts and enable the shafts to be angularly displaced relative to one another.

An angle of up to approximately 35° may be formed between the input drive shaft and the output drive shaft, if the rotational velocity of the drive line is not excessive when the angle is large. The higher the rotational velocity the smaller the angle which can be formed between the shafts. The output drive shaft makes one revolution for each revolution of the input drive shaft.

Experience has shown that conventional U-joints have a fairly high rate of failure. A significant number of these failures are related to lubricating film breakdown. This may be caused by a lack of lubricant, inadequate lube quality for the application, inadequate initial lubrication, or failure to lubricate properly and often enough. Other failures have been associated with installation and manufacturing errors as well as excessive angular displacement between the shafts and excessive operational speeds. Drive shaft failures through torque, fatigue and bending are associated with overload, excessively high U-joint angles and drive shaft lengths excessive for operating speeds. Vibrations caused by slight variation in the RPM (revolutions per minute) of the output drive shaft relative to the input drive shaft (resulting from the centers of the angular rotation of the coupling being rigidly held in one rotating plane) are also a major source of failure in conventional U-joints. These vibrations over time wear out the bearings and ultimately lead to failure of the joint. They also make for rough and noisy operation.

The present invention is directed to overcoming or at least minimizing some of the problems mentioned above.

SUMMARY OF THE INVENTION

In accordance with one aspect of the present invention, an elastomeric drive line coupling is provided. The coupling includes an input drive shaft having a longitudinal axis and terminating at one end with a housing and an output drive shaft having a longitudinal axis and terminating at one end with a ball. The housing has an inner contoured surface which is substantially elliptically shaped in a plane transverse to the longitudinal axis of the input drive shaft and substantially circularly shaped in a plane parallel to the longitudinal axis of the input drive shaft. The ball has an outer contoured surface which is substantially elliptically shaped in a plane transverse to the longitudinal axis of the output drive shaft and substantially circularly shaped in a plane parallel to the longitudinal axis of the output drive shaft. The outer contoured surface of the ball is coupled to the inner contoured surface of the housing to transmit torque from the input drive shaft to the output drive shaft and to facilitate angular deflection of the output drive shaft relative to the input drive shaft in at least one plane.

In another aspect of the invention, a shell is provided which has an inner surface and an outer surface disposed between the housing and the ball. The shell transmits torque between the housing and the ball and provides a plane of rotation in which the output drive shaft can be angularly deflected relative to the input drive shaft. A first elastomeric layer is disposed between the outer surface of the ball and the inner surface of the shell which deforms in compression to transmit torque between the shell and the ball and deforms in shear to enable the output drive shaft to be angularly deflected relative to the input drive shaft. A second elastomeric layer is disposed between the outer surface of the shell and the inner surface of the housing which deforms in compression to transmit torque between the housing and the shell and deforms in shear to enable the output drive shaft to be angularly deflected relative to the input drive shaft.

The ball, the first elastomeric layer and the inner surface of the shell form an inner nested ellipsis core. The outer surface of the shell, the second elastomeric layer and the inner surface of the housing form a second or outer nested ellipsis shell, the inner nested ellipsis core being oriented 90° out of phase from the outer nested ellipsis shell. Additional shells may be provided between the ball and the housing. Each additional shell adds another elastomeric ellipsis to the assembly and provides an additional plane of rotation in which the output drive shaft can be angularly deflected relative to the input drive shaft.

In yet another aspect of the invention, the ball, shell and housing are all spherically shaped. A pair of ribs disposed on the outer surface of the ball in the transverse plane is provided, each rib of the pair being disposed opposite the other. A pair of ribs disposed on the outer surface of the shell is also provided, each rib of the pair being disposed opposite the other. Indentations formed in the inner surface of the shell and in the inner surface of the housing are provided to accommodate the pairs of ribs disposed on the outer surfaces of the ball and the shell, respectively. The pairs of ribs engage the ball with the shell and the shell with the housing facilitating the transmission of torque between the input drive shaft and the output drive shaft. A conical elastomer seal, attached at one end to the housing and at the other end to the output drive shaft, may also be provided for sealing the housing of the coupling to allow a lubricant to be pumped into the housing.

The foregoing and other advantages of the present invention will become apparent upon reading the following detailed description and upon reference to the drawings in which.

Figure 2:
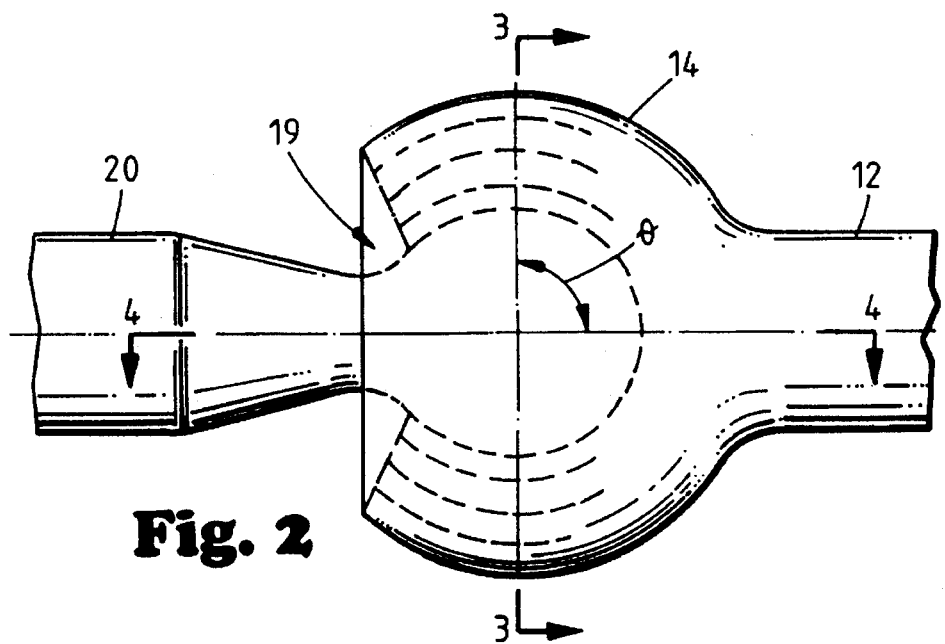
FIG. 2 is a side view of the coupling along plane 2—2 in FIG. 1. This view illustrates the spherical shape of the coupling in the longitudinal plane.
Figure 6:
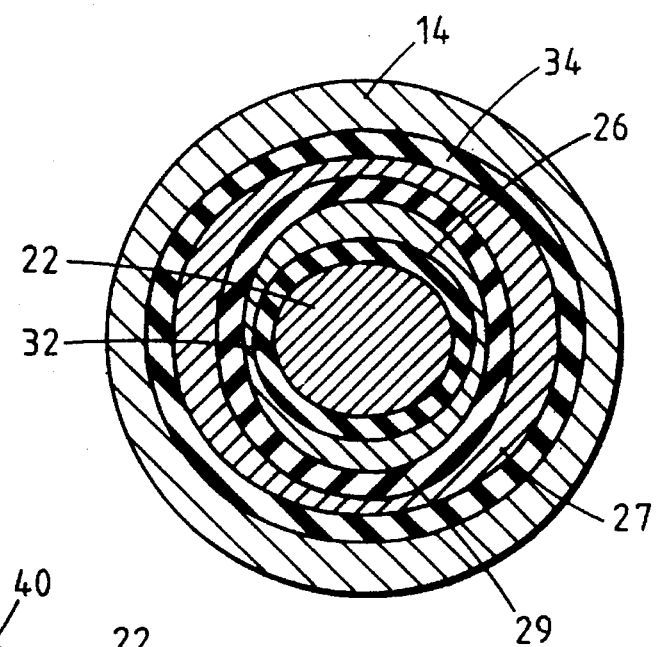

FIG. 6 is a cross-sectional view of a further embodiment of the elastomeric drive line coupling according to the present invention along the transverse plane 3—3 in FIG. 2. This view illustrates the elliptical shape of the coupling in the transverse plane. Three elastomeric ellipses are shown oriented 60° out of phase from each other.

Figure 7:
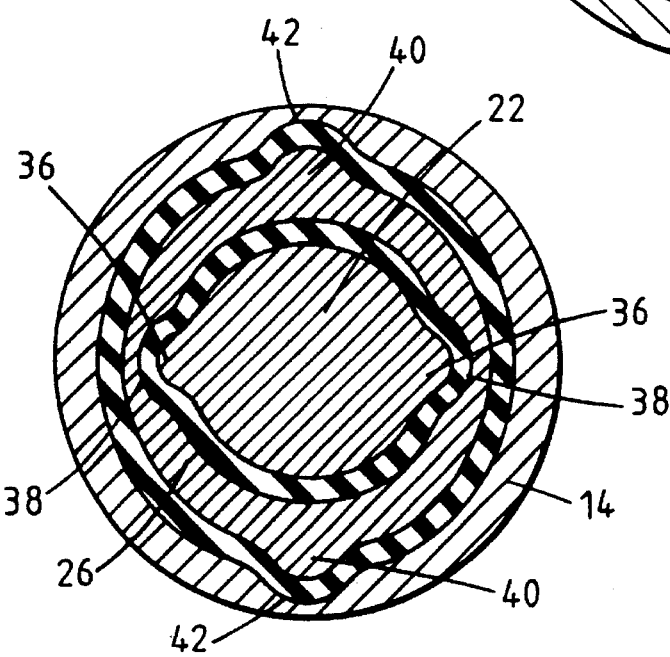

FIG. 7 is a cross sectional view of still another embodiment of the elastomeric drive line coupling according the present invention along the transverse plane 3—3 in FIG. 2.

Figure 8:
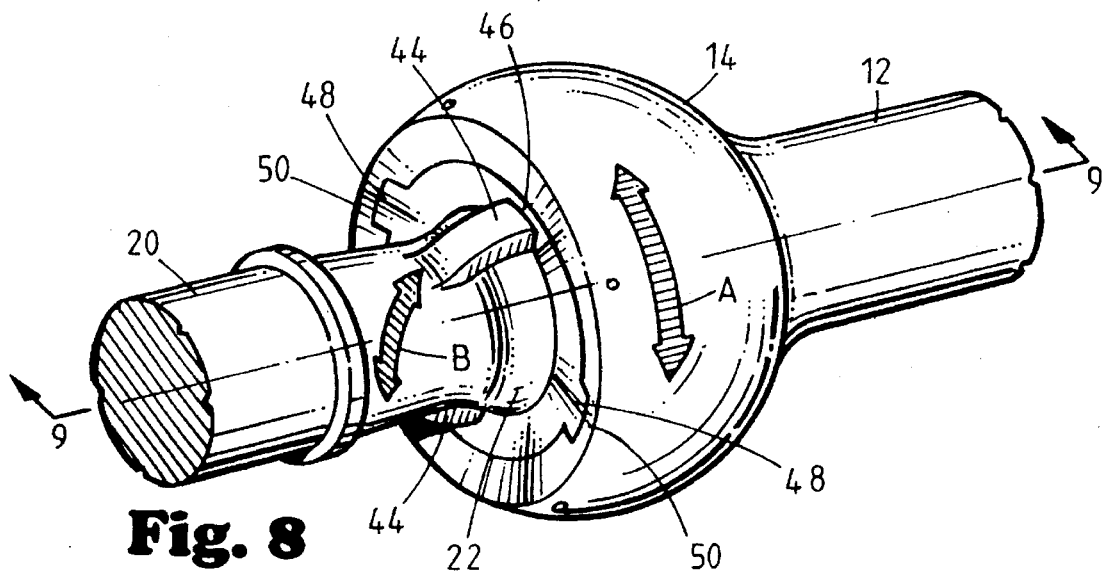

FIG. 8 is a perspective view of an alternate embodiment of the drive line coupling according to the present invention.

Figure 9:
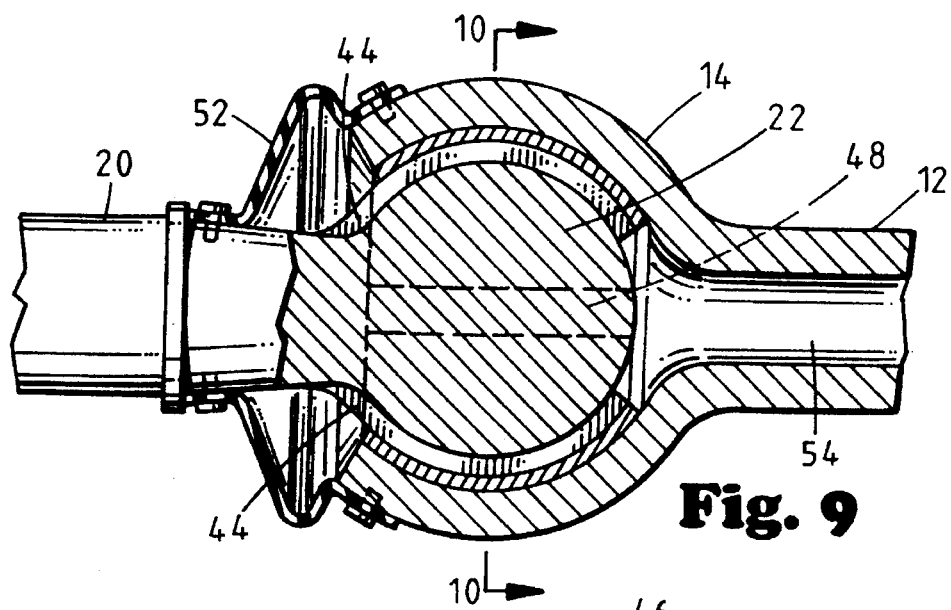

FIG. 9 is a side view of the coupling along plane 9—9 in FIG. 8.

Figure 10:
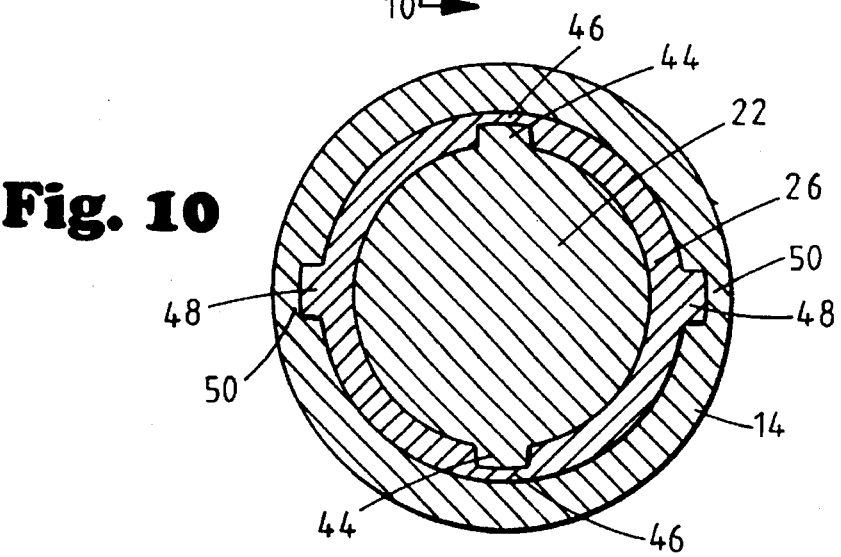

FIG. 10 is a cross-sectional view of the coupling along transverse plane 10—10 in FIG. 9.

While the present invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DETAILED DESCRIPTION OF PREFERRED EMBODIMENTS OF THE INVENTION

Figure 1:
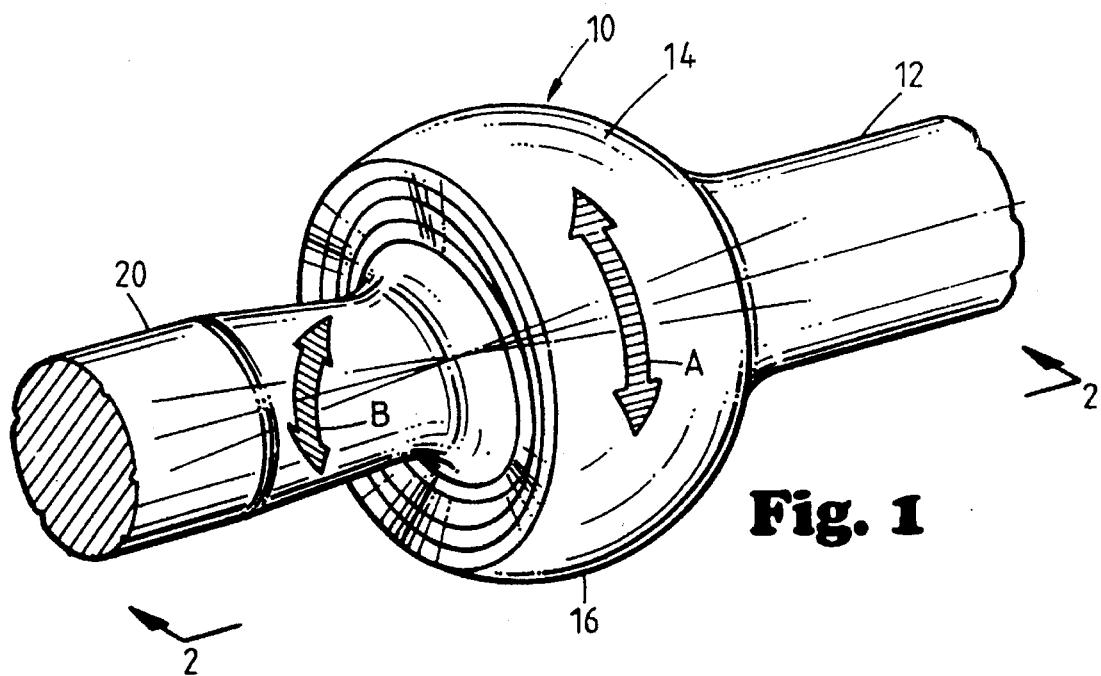
FIG. 1 is a perspective view of an elastomeric drive line coupling according to the present invention.

Turning now to the drawings and referring initially to FIG. 1, an elastomeric drive line coupling is illustrated and generally designated by a reference numeral 10. Externally the coupling 10 looks like a spherical ball joint. Internally, however, it is quite different. The coupling 10 consists of alternating layers of elastomer and metal, bonded and vulcanized into an integrated assembly. In the plane which is perpendicular to the applied torque, the coupling 10 utilizes an oblong rather than spherical geometry along with deformation of an elastomer to accommodate the torque. Thus, coupling 10 utilizes varying geometry to accommodate differing dynamic requirements on different axes and utilizes the anisotropic properties of the elastomer to its fullest advantage.

Figure 3:
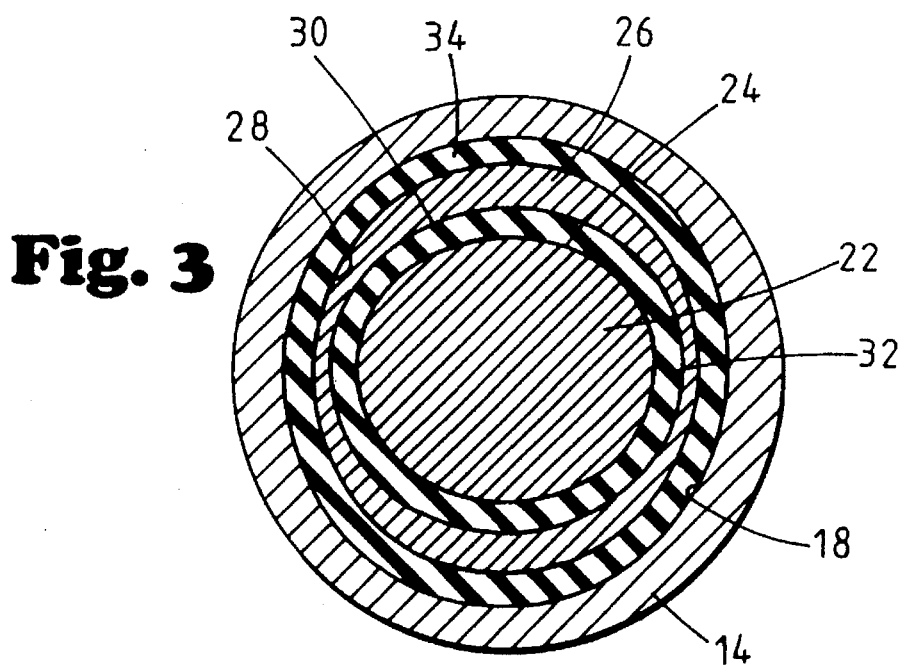
FIG. 3 is a cross-sectional view of the coupling along transverse plane 3—3 in FIG. 2 This view illustrates the elliptical shape of the coupling in the transverse plane. Two elastomeric ellipses are shown oriented 90° out of phase from each other.
Figure 4:
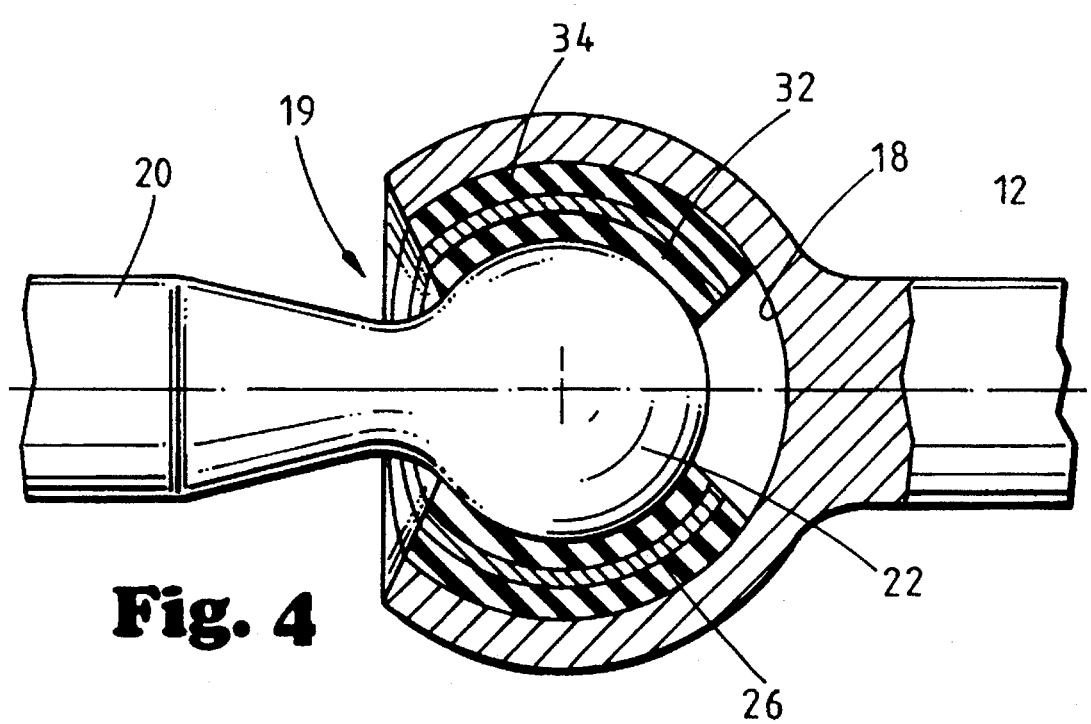
FIG. 4 is another cross-sectional view of the coupling along longitudinal plane 4—4 in FIG. 2.

More specifically, the coupling 10 includes an input drive shaft 12 and a housing 14. The housing 14 is preferably integrally connected to an end of the input drive shaft 12. The housing 14 has an outer surface 16 which is spherically shaped and an inner surface 18 which is partially elliptically shaped and partially circularly shaped, as shown in FIGS. 3 and 4. The housing 14 also has an opening 19 (shown in FIG. 2). The inner surface 18 of the housing 14 forms an outer ellipsis. The inner surface 18 of the housing 14 is elliptical in shape in the transverse plane 3—3 (perpendicular to the axis of the input drive shaft 12), as shown in FIG. 3, and circular in shape in the longitudinal plane 4—4 (along the axis of the input drive shaft), as shown in FIG. 4. An angle θ (shown in FIG. 2) formed between the transverse plane 3—3 and the longitudinal plane 4—4 is preferably 90°. Both the input drive shaft 12 and the housing 14 are preferably formed of either machined metals or molded composite materials which can withstand high torsional and tensile loads.

The coupling 10 also includes an output drive shaft 20 and a ball 22 having an outer surface 24. Preferably, the ball 22 is integrally connected to an end of the output drive shaft 20, as shown in FIGS. 1–4. The outer surface 24 of the ball 22, like the inner surface 18 of the housing 14, is elliptical in shape in the transverse plane 3—3, as shown in FIG. 3, and circular in shape in the longitudinal plane 4—4, as shown in FIG. 4. The ball 22 is concentrically disposed within the housing 14 to allow the output drive shaft 20 to pivot relative to the input drive shaft 12, as shown in FIG. 1. Both the output drive shaft 20 and the ball 22 are also preferably formed of a machined metal or molded composite material which can withstand high torsional and tensile loads.

A shell 26 having an outer surface 28 and an inner surface 30 is preferably disposed between the housing 14 and the ball 22, as shown in FIGS. 3 and 4. The inner and outer surfaces of the shell 26 are also elliptical in shape in the transverse plane 3—3, and circular in shape in the longitudinal plane 4—4, as shown in FIGS. 3 and 4. The inner and outer elliptical surfaces of the shell are shifted 90° out of phase in the transverse plane. The shell 26 is preferably made of metal or a composite material, e.g. rubber reinforced with fibers.

An elastomeric layer 32 is disposed between the ball 22 and the shell 26, as shown in FIGS. 3 and 4. The elastomeric layer 32 is bonded (e.g. by a vulcanization process) to the outer surface 24 of the ball 22 and to the inner surface 30 of the shell 26 thus forming an inner nested ellipsis having an outer surface. A second elastomeric layer 34 is disposed between the shell 26 and the housing 14. The elastomeric layer 34 is bonded to the outer surface 28 of the shell 26 and the inner surface 18 of the housing 14 thus forming an outer nested ellipsis having an inner surface and an outer surface. The elastomeric layers 32 and 34 transmit torsional load between the housing 14 and the ball 22. They also provide a flexible link in the drive train limiting the stresses in the metal components of the coupling 10.

Furthermore, the elastomeric layers 32 and 34 continuously and permanently lubricate the coupling 10 during operation, thus providing a maintenance free coupling. Additives can be added to the elastomeric layers 32 and 34 to increase their viscosity under high frictional stresses. The elastomeric layers 32 and 34 also dampen vibrations and absorb shock loads as well as noise in the drive line. This results in smoother and quieter drive shaft operation which ultimately enhances the operational life of the coupling 10 and reduces stresses on the mechanical systems within which the drive line operates.

The elastomeric layers 32 and 34 are preferably formed of natural rubber, or a synthetic rubber such as nitrile, neoprene or similar compound. Rubber is chosen because its properties in one direction are totally independent of its properties in another. For example, suppose an unloaded sheet of rubber is subjected to a shear deflection in one direction and its springrate is measured in that direction. Suppose then that the same sheet is subjected to a very large compressive load in another direction followed by the same shear deflection. If the springrate is again measured under shear loading, it will be unchanged by the compressive load, i.e., the compressive load has no significant effect on the shear springrate of the rubber sheet. A further advantage of natural and synthetic rubbers is that they are much stiffer in compression than in shear, can accommodate much higher loads in compression than in shear, and have infinitely longer fatigue life expectancy when loaded in compression as compared to shear.

All of these characteristics of rubber make it ideal for use in the elastomeric layers 32 and 34. The elastomeric layers 32 and 34 enable the coupling 10 to transmit torque over an extremely wide range of RPM while accommodating large and small angular deflections of the drive line. This is accomplished by compounding the elastomeric layers 32 and 34 to have very soft deflection characteristics in the shear direction and much stiffer deflection characteristics in the compression mode.

The elastomeric layers 32 and 34 are circularly shaped in the longitudinal direction allowing the internal surfaces of the coupling 10 to slide relative to one another and permitting the drive line to bend. The elastomeric layers 32 and 34 being rubber, and hence semi-viscous, act as a lubricating medium between the sliding surfaces. The elastomeric layers 32 and 34 provide very little resistance in shear to the relative movement of the internal surfaces as the drive line bends during each revolution.

The elastomeric layers 32 and 34 are elliptically shaped in the transverse direction. When torque is applied to the coupling 10, the elastomeric layers 32 and 34 will initially deflect in shear. However, as the load increases the elliptically shaped boundaries on either side of each rubber layer will assure that the rubber (at some threshold point) will begin to load in compression as one elliptical surface attempts to rotate within another.

If the elliptical shape in the transverse direction is too pronounced or acute it will interfere with the free deflection of the coupling 10 in bending. If it is too small (close to being circular) then the compression resistance in the torsional direction will not develop and the coupling 10 will merely act as a ball joint with all the debilities of a device which relies on pure shearing action of an elastomer medium (limited load and fatigue capacity, susceptibility to catastrophic failure).

The elastomeric layers 32 and 34 are preferably between ⅛" to 1" thick depending upon the use of the coupling 10. The stiffness (modulus) of these layers also depends upon its application and is preferably between 400 to 3000 psi (pounds per square inch). The primary design considerations are torsion load, angular deflection, RPM and fatigue life required for the coupling 10. High torsional loads mitigate towards thinner layers while large deflection angles require greater total rubber thickness in the design. Sometimes it is necessary to use numerous relatively thin layers in order to achieve both and satisfy the fatigue requirements. The choice of rubber compound provides a secondary means of modifying stiffness.

As way of example, a coupling used in an automobile typically requires between 0 and 1,000 ft/lbs of torque, whereas a coupling in submarine typically requires between 0 and 100,000 ft/lbs of torque. In the latter application, the elastomeric layers 32 and 34 should be at least ½" thick and have an approximate stiffness of 1500 psi. Under high torsional loads, the elastomeric layers 32 and 34 are compressed to as much as 50 % of their unloaded state. This corresponds to a shape-factor (i.e., loaded area as compared to area free to bulge) of approximately 4.

The ellipses formed in the transverse direction of the elastomeric layers 32 and 34 comprise a set of rotation points. These points of rotation are located at the ends of the major axes of the ellipses. They are the points within the coupling 10 about which the bending deformation occurs during each revolution of the drive line. They are also the points where the greatest shear strain occurs during each deflection cycle. To minimize the overall shear loading on the coupling 10, these points should be evenly dispersed about the circumference of the coupling. They should not all be on the same axes. Accordingly, each additional elastomeric layer added to the assembly should be oriented out of phase with the preceding elastomeric layer.

The coupling 10 can be easily manufactured using the following method. First, all the metal components making up the shafts, housing, ball and shell(s) are cast using molds. Next, the metal surfaces to be bonded, i.e., the inner surface 18 of the housing 14, the outer surface 24 of the ball 22, and the inner and outer surfaces of the shell 26 are prepared using a series of preparation steps. First, the surfaces are cleaned, preferably by sandblasting, to remove any debris that might weaken the bonds with the elastomeric layers. Second, the metal surfaces are degreased to remove any grease or oil that also might weaken the bonds with the elastomeric layers. Third, a primer is applied to metal surfaces for establishing a bonding surface. Lastly, an adhesive (e.g., Chemlock™ 210 or 220) is applied over the primer for bonding the elastomeric layers 32 and 34 to the metal surfaces.

Once the surfaces have been prepared, the coupling 10 is ready for assembly inside the mold tool. The shell 26 and the ball 22 are assembled in a nested fashion inside the housing 14. This can be done because the opening 19 of the housing 14 is preferably larger than the focal lengths of the shell 26 and the ball 22 in the elliptical direction. After the shell 26 and the ball 22 have been placed inside the housing 14, the elastomeric layers 32 and 34 are injected between the ball 22 and the shell 26 and the shell and the housing 14, respectively, using an injection molding process which injects elastomeric material in a liquid state under a high temperature and pressure. A transfer molding process may also be used in place of the injection molding process. The transfer molding process forces the elastomeric material in a quasi-liquid state into the cavity using a ram. Finally, after the elastomeric layers 32 and 34 have been injected into the cavity, they are cured using a curing cycle which utilizes a combination of pressure and heat.

In an alternate method of assembly, the elastomeric layers 32 and 34 are adhesively cold bonded to the ball 22 and shell 26 and then adhesively cold bonded to the inner surface 18 of the housing 14 as the ball 22 and shell 26 are finally placed in a nested fashion within the housing 14. Injection or transfer molding techniques are preferable, however, in a high volume production process.

An advantage of this construction is that it provides for virtually fail-safe operation. Even if all the rubber forming the elastomeric layers 32 and 34 is damaged, the coupling 10 will continue to transmit torque and will not fall apart or allow the output drive shaft 20 to come loose. In this situation, the housing 14 acts as a containment cage for the internal components. As long as the housing 14 is intact, the output drive shaft 20 will remain fixed in its installed orientation and will not drop or come loose and damage equipment around it.

The elastomeric coupling 10 preferably utilizes elliptically shaped internal surfaces in the transverse plane to transmit torque about the output drive shaft 20 and circularly shaped internal surfaces in the longitudinal plane to permit angular deflections of the output drive shaft relative to the input drive shaft 12. Torsional power is therefore transmitted in the elliptical plane of the coupling while angular deflections are transmitted in the circular plane of the coupling. Both torque and angular deflections may be transmitted simultaneously. Arrow A in FIG. 1 illustrat6s the direction in which torsional power is transmitted and Arrow B illustrates the direction of angular deflections. An advantage of this configuration is that it allows the centers of rotation of the input drive shaft 12 and the output drive shaft 20 to move out-of-plane along a spherical arc as the output drive shaft deflects angularly during each rotation cycle. This results in no variation in velocity between the input drive shaft 12 and the output drive shaft 20 thereby affording smoother operation.

As discussed above, the internal geometry of the coupling 10 is circular in the longitudinal plane 4—4. This allows the angular deflections of the shaft to be accommodated through shear deflections of the elastomeric layers 32 and 34 as the ellipses attempt to slide relative to one another. As also discussed above, the geometry of the coupling 10 is elliptical in the transverse plane 3—3. This allows the torsional loads applied to the shaft to be accommodated through compression deformation of the elastomeric layers 32 and 34 as the ellipses attempt to rotate relative to one another.

Misalignments of the input drive shaft 12 and the output drive shaft 20 are accommodated by the ball 22 pivoting relative to the housing 14 of the coupling 10. In the longitudinal circular plane 4—4, the elastomeric layer 32 bonded to the ball 22 also rotates (or deforms) about the central axis of the circular plane and, in turn, causes the adjacent shell 26 and elastomeric layer 34 bonded thereto to rotate proportionately. The angular rotation of the output drive shaft 20 is divided proportionately between the elastomeric layers 32 and 34, i.e., each elastomeric layer carries one-half of the shear load being applied to the coupling 10 as the internal surfaces rotate relative to one another. The elastomer deformed in shear will tend to act as a "softening spring" in the region of normal loadings. In the transverse elliptical plane 3—3, during angular deflection, the ball 22 and corresponding elastomeric layer 32, as well as the shell 26 and corresponding elastomeric layer 34, all rotate about a right hand axis perpendicular to the plane of angular deflection.

When torque is applied to the coupling 10, the elliptical shape (in the transverse plane 3—3) will cause the elastomeric layers 32 and 34 to deform initially in shear and then transition to compression. The elastomer deformed in compression will tend to act as a "stiffening spring" in the region of normal loadings. The deformation mode and dynamic characteristics of the coupling 10 will be somewhat dependent on the angle of the nested ellipses (degree of the ellipses) chosen for the specific design. (The degree of an ellipse is the angle that the line of sight makes with the plane of the circle which is the complement of the angle between the plane of the circle and the picture plane). This is due to the effect of the elliptical metal surfaces (which form the boundaries for each elastomer layer) trying to rotate within one another. The higher the angle of the nested ellipses (the closer the approximate to a circle) the closer the rubber is to being in a complete shear mode when a torsional load is applied to the coupling 10. The angle is preferably chosen around the point where the rubber will be in compression when a maximum torsional load is applied to the coupling 10. The load requirements of the coupling primarily determines the angle of the nested ellipses. Preferably the angle is selected between 70° and 80°.

Torque is transmitted by the input drive shaft 12 to the housing 14, through the elastomeric layer 34, through the intermediate shell 26, through the elastomeric layer 32, and then to the ball 22 at the end of the output drive shaft 20.

Any number of nested ellipses of internal shells and elastomeric layers may be used. Each additional nested shell adds another plane in which the output drive shaft 20 may be angularly displaced relative to the input shaft 12. If no shells are provided, there is only one plane of angular deflection and the inner ellipsis formed by the outer surface 24 of the ball 22 is in phase, i.e., aligned, with the outer ellipsis formed by the inner surface 18 of the housing 14. If one shell is provided, there are two planes of angular displacement and the two elliptic surfaces formed by the shell 26 are oriented 90° out of phase. The inner and outer elliptic surfaces of the shell are in phase with the elliptic surfaces formed by the ball 22 and the housing 14, respectively. The elastomer pads are elliptic in the transverse plane so as to provide a compressive mode of actuation in response to applied torque. They are oriented out of phase with one another so as to disperse the planes of angular deflection evenly about the circumference of the coupling 10. If two shells are provided, there are three planes of angular displacement and the intermediate ellipses formed by the shells are oriented 60° out of phase from each other and the inner and outer ellipses formed by the ball 22 and the housing 14, respectively; for three shells it would be 45° and so forth. The phase angle between ellipses is determined by dividing the number of elastomeric layers into 180°. For each additional shell that is provided, another plane of angular displacement is created.

The above described embodiments make the coupling 10 relatively stiff in the torsional direction, yet still compliant in order to provide shock and vibration attenuation. In the angular deflection (bending) direction, the coupling 10 is very soft with as little resistance as possible to the induced angular excursions of the shafts. Because of its unique anisotropic capacity to exhibit different dynamic characteristics on different axes, natural rubber and other synthetic elastomers are ideally suited to this requirement.

Figure 5:
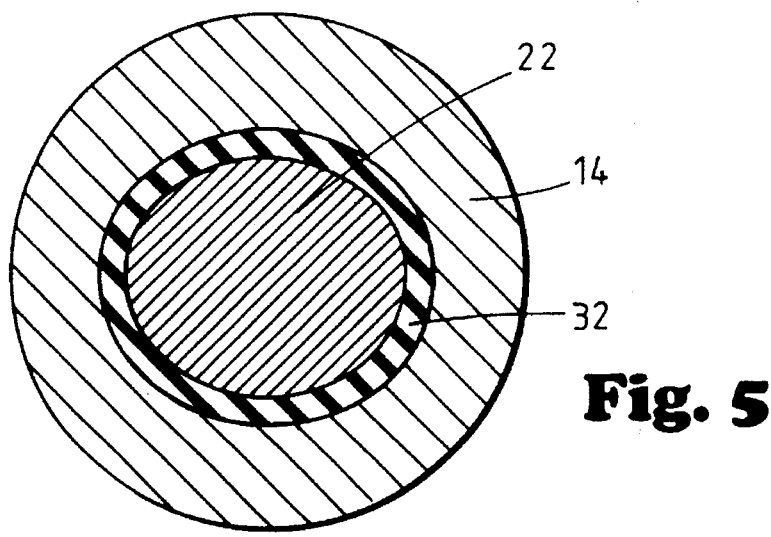
FIG. 5 is a cross-sectional view of another embodiment of the elastomeric drive line coupling according to the present invention along the transverse plane 3—3 in FIG. 2.

Alternate embodiments of the coupling 10 may also be provided. FIG. 5 shows one such alternate embodiment. In the embodiment shown in FIG. 5, no shells are provided between the housing 14 and the ball 22. Rather, only one elastomeric layer 32 is provided between the ball 22 and the housing 14. As noted above, in this configuration the inner ellipsis formed by the outer surface 24 of the ball 22 is oriented in phase with the outer ellipsis formed by the inner surface 18 of the housing 14. Also in this embodiment, angular deflections of the output drive shaft 20 relative to the input drive shaft 12 will take the form of rotations about the minor axis of the ellipse.

FIG. 6 shows another alternate embodiment of the coupling 10. In this embodiment, two shells are provided between the housing 14 and the ball 22. A second shell 27 is provided between the first shell 26 and the inner surface 18 of the housing 14. Accordingly, another elastomeric layer 29 is provided between the first shell 26 and the second shell 27. The intermediate ellipses formed by the first and second shells 26 and 27 are oriented 60° out of phase from one another and 60° out of phase from the inner and outer ellipses formed by the outer surface 24 of the ball 22 and the inner surface 18 of the housing 14, respectively. The shell 27 adds an additional plane in which angular deflections can take place over the embodiment shown in FIGS. 1–4. Thus, in this embodiment angular deflections can take place in three different directions.

FIG. 7 shows another alternate embodiment of the coupling 10. In this embodiment, a pair of ribs 36 are disposed at the major axes of the ellipsis formed at the outer surface 24 of the ball 22 in the transverse plane 3—3. In this embodiment, the shape of the ball 22 in the transverse plane 3—3 can be either elliptical or circular. The elastomeric layer 32 conforms to the ribbed surface of the ball 22. The inner surface 30 of the shell 26 has indentations 38 to accommodate the ribs 36 in the ball 22. A pair of ribs 40 is also provided at the major axes of the ellipsis formed at the outer surface 28 of the shell 26 in the transverse plane 4-4. The elastomeric layer 34 conforms to the ribbed surface of the shell 26. Furthermore, the inner surface 18 of the housing 14 has indentations 42 to accommodate the pair of ribs 40 disposed on the outer surface 28 of the shell 26. The pairs of ribs 36 and 40 increase the transmission of torsional load applied to the output drive shaft 20 by reducing any slippage that might occur between the inner and intermediate nested ellipses relative to each other and relative to the outer ellipsis formed by the inner surface 18 of housing 14.

FIGS. 8–10 show yet another alternate embodiment of the coupling 10. This embodiment is a variation of the embodiment shown in FIG. 7. In this embodiment, a pair of protrusions 44 are disposed on the outer surface 24 of the ball 22, each protrusion being disposed on the opposite side of the outer surface from the other protrusion. The inner surface 30 of the shell 26 has a pair of indentations 46, each indentation being disposed on the opposite side of the other, the pair of indentations 46 accommodating the pair of protrusions 44 in the ball 22. A pair of protrusions 48 are also disposed on the outer surface 28 of the shell 26, each protrusion being disposed on the opposite side of the other protrusion. A pair of indentations 50 is disposed on the inner surface 18 of the housing 14, each indentation being disposed on the opposite side of the other, the pair of indentations 50 accommodating the protrusions 48 on the outer surface 28 of the shell 26. The plane containing the protrusions 44 is preferably oriented 90° out of phase from the plane containing the protrusions 48. No more than 2 protrusions on each surface are allowed for angular deflections to occur.

In this embodiment, the protrusions 44 and 48, like the ribs 36 and 40 in the embodiment disclosed in FIG. 7, facilitate the transmission of torque between the input drive shaft 12 and the output drive shaft 20. The protrusions 44 and 48 are responsible for the entire transmission of torque. Therefore, the outer surface 24 of the ball 22, the inner surface 18 of the housing 14, and both surfaces of the shell 26 may be entirely spherical in shape and need not be elliptical in shape in the transverse plane. Furthermore, with this embodiment, elastomeric layers need not be provided between the ball, shell, and housing. Rather, a conical elastomeric seal 52 attached at one end to the housing 14 and at the other end to the output drive shaft can be used to seal the housing 14 so that a lubricant such as oil can then be pumped into the housing to keep the coupling 10 lubricated. The lubricant can be supplied to the housing along pathway 54 which may be disposed within the input drive shaft 12, as shown in FIG. 9.

The coupling 10 described by reference to the figures herein is believed to be much more economical to produce than the current universal joint technology employing circular mechanical bearings. The use of the elastomeric layers 32 and 34 in these embodiments is also believed to provide far greater operational life and reliability than conventional drive line couplings and allow for the incorporation of fail-safe design principles. The elastomeric coupling 10 is further believed to offer the advantages of inherent damping of shock loads, noise and vibration in the drive line as well as constant velocity cyclic characteristics.

What is claimed is:

1. A drive line coupling, comprising:

an input drive shaft having a longitudinal axis and terminating at one end with a housing, the housing having an inner contoured surface which has a non-circular elliptical shape in a plane transverse to the longitudinal axis of the input drive shaft, said elliptical shape having an major axis and a minor axis and a circular shape in a plane parallel to the longitudinal axis of the input drive shaft; and an output drive shaft having a longitudinal axis and terminating at one end with a coupling member the coupling member having an outer contoured surface which has a non-circular elliptical shape in a plane transverse to the longitudinal axis of the output drive shaft said elliptical shape having a major axis and a minor axis, and a circular shape in a plane parallel to the longitudinal axis of the output drive shaft; and at least one elastomeric layer disposed between the inner contoured surface of the housing and the outer contoured surface of the coupling member; and wherein the major axis of the non-circular ellipse of the housing is out of a phase with the major axis of the non-circular ellipse of the coupling member; and wherein said at least one elastomeric layer deforms in compression to transmit torque from the input drive shaft to the output drive shaft and deforms in shear to facilitate angular deflection of the output drive shaft relative to the input drive shaft in at least one plane.

2. The drive line coupling according to claim 1, further comprising:

at least one shell having an inner surface and an outer surface disposed between the housing and the coupling member;

said at least one shell also having a non-circular elliptical shape in plane transverse to the longitudinal axis of the input drive shaft, said elliptical shape having a major axis and a minor axis;

said at least one shell also having at least one elastomeric layer disposed between the at least one shell and the outer surface of the coupling member, and at least one elastomeric layer disposed between the at least one shell and the inner surface of the housing;

wherein the major axis of the non-circular elliptical shape of the coupling member is out of phase with the major axis of the non-circular elliptical shape of the at least one shell and wherein the major axis of the non-circular elliptical shape of the at least one shell is out of phase with the major axis of the non-circular elliptical shape of the housing;

wherein said at least one shell transmits torque between the housing and the coupling member by deforming said at least one elastomeric layer in compression: and wherein said at least one shell provides a plane of rotation in which the output drive shaft can be angularly deflected relative to the input drive shaft.

3. A drive line coupling, comprising:

an input drive shaft having an longitudinal axis;

a housing attached to one end of the input drive shaft, the housing having an inner contoured surface;

output drive shaft having a longitudinal axis;

a coupling member having a non-circular elliptical shape in at least one plane, attached to one end of the output drive shaft, the coupling member having an outer contoured surface that is coupled to the inner contoured surface of the housing to transmit torque from the input drive shaft to the output drive shaft and to facilitate angular deflections of the output drive shaft relative to the input drive shaft in at least one plane;

an inner nested shell disposed between the housing and the coupling member;

an outer nested shell disposed between the inner nested shell and the housing, each nested shell having an inner surface and an outer surface which transmits torque between the housing and the coupling member and providing a plane in which the output drive shaft is angularly deflectable relative to the input drive shaft;

a first elastomeric layer disposed between the surface of the coupling member and the inner surface of the inner nested shell;

a second elastomeric layer disposed between the outer surface of the inner nested shell and the inner surface of the outer nested shell;

a third elastomeric layer disposed between the outer surface of the outer nested shell and in the surface of the housing;

wherein the coupling member, the first elastomeric layer and the inner surface of the inner nested shell form an inner nested ellipsis core outer surface of the inner nested shell, the second elastomeric layer and the inner surface of the outer nested shell form a first intermediate nested ellipsis shell, and the outer surface of the outer nested shell the third elastomeric layer and the inner surface of the housing form a second intermediate nested ellipsis shell, the inner nested ellipsis core being oriented 60° out of the phase from the first intermediate nested ellipsis shell and the first intermediate nested ellipsis shell being oriented 60° out of phase from the second intermediate ellipsis shell; and wherein the elastomeric layers deform in compression to transmit torque between the housing and the coupling member and deform in shear to enable the output drive shaft to be angularly deflected relative to the input drive shaft.

4. The drive line coupling according to claim 3, wherein the inner surface of the housing has a non-circular elliptical shape in at least one plane which is oriented 60° out of phase from the outer surface of the outer nested shell.

* * * * *

UNITED STATES PATENT AND TRADEMARK OFFICE
CERTIFICATE OF CORRECTION

PATENT NO. : 5,573,463

DATED : Nov. 12, 1996

INVENTOR(S) : Arlt

It is certified that error appears in the above-identified patent and that said Letters Patent is hereby corrected as shown below:

Column 10, line 15, after "member" insert -- , --.

Column 10, line 19, after "shaft" insert -- , --.

Column 10, line 50, after "shell" insert -- , --.

Column 11, line 23, change "shelland in the" to -- shell and the inner --.

Column 12, line 3, after "core" insert -- , the --.

Column 12, line 8, after "shell" insert -- , --.

Signed and Sealed this

Twenty-ninth Day of April, 1997

Attest:

BRUCE LEHMAN

Attesting Officer

Commissioner of Patents and Trademarks